(12) United States Patent
Tomassetti et al.

(10) Patent No.: US 6,934,300 B2
(45) Date of Patent: Aug. 23, 2005

(54) INITIALIZATION METHOD FOR AN ENTERTAINMENT AND COMMUNICATIONS NETWORK

(75) Inventors: Stephen Robert Tomassetti, Newbury Park, CA (US); Donald C. Snedigar, Irving, TX (US); Thomas Gerald Wojciechowski, Chicago, IL (US)

(73) Assignee: M&S Systems, L.P., Dallas, TX (US)

( * ) Notice: Subject to any disclaimer, the term of this patent is extended or adjusted under 35 U.S.C. 154(b) by 788 days.

(21) Appl. No.: 09/849,198

(22) Filed: May 4, 2001

(65) Prior Publication Data

US 2002/0186662 A1 Dec. 12, 2002

(51) Int. Cl.⁷ ............................................. H04L 12/43
(52) U.S. Cl. ...................................... 370/461; 370/449
(58) Field of Search ................................ 370/431, 449, 370/453, 461, 462; 725/95–97, 138, 144–146

(56) References Cited

U.S. PATENT DOCUMENTS

| | | | |
|---|---|---|---|
| 4,866,702 A | * | 9/1989 | Shimizu et al. ............. 370/438 |
| 4,901,367 A | | 2/1990 | Nicholson |
| 4,920,432 A | | 4/1990 | Eggers et al. |
| 5,086,385 A | | 2/1992 | Launey et al. |
| 5,107,256 A | | 4/1992 | Ueno et al. |
| 5,500,794 A | | 3/1996 | Fujita et al. |
| 5,608,730 A | | 3/1997 | Osakabe et al. |
| 5,650,775 A | | 7/1997 | Van Steenbrugge |
| 5,805,806 A | | 9/1998 | McArthur |
| 5,818,512 A | | 10/1998 | Fuller |
| 5,835,126 A | | 11/1998 | Lewis |
| 5,884,028 A | | 3/1999 | Kindell et al. |
| 5,886,732 A | | 3/1999 | Humpleman |
| 5,905,521 A | | 5/1999 | Gatto et al. |
| 5,915,091 A | | 6/1999 | Ludwig et al. |
| 5,936,945 A | | 8/1999 | Shibata et al. |
| 5,940,387 A | | 8/1999 | Humpleman |
| 5,949,473 A | | 9/1999 | Goodman |
| 5,953,350 A | | 9/1999 | Higgins |
| 5,978,835 A | | 11/1999 | Ludwig et al. |
| 5,983,068 A | | 11/1999 | Tomich et al. |
| 6,005,861 A | | 12/1999 | Humpleman |
| 6,008,777 A | | 12/1999 | Yiu |

* cited by examiner

*Primary Examiner*—Phirin Sam
*Assistant Examiner*—Robert W. Wilson
(74) *Attorney, Agent, or Firm*—Hogan & Hartson, LLP

(57) ABSTRACT

A method of initializing a multi-zone peer-to-peer entertainment and communications network. During normal network operation, data is streamed from one or more entertainment media source nodes to multiple independent other nodes and, then, passed to connected receivers and/or transceivers. The receivers and transceivers may be located in different zones from each other. The zones may be different rooms in a building or house. The initialization sequence is an autonomous process. During initialization, at least one backplane address is assigned to each network hub port and to each local node. One hub port is designated as backplane master. Upon power-up or a reset, a remote scan is initiated, automatically, from the hub ports to the remote nodes. Any remote requiring an address responds to the remote scan indicating that one or more addresses are needed. Then, nodes requesting addresses enter a contention arbitration phase to select the next requesting node which is assigned addresses next. Addresses are assigned to the remote mode nodes, giving priority according to serial number, lowest to highest. Each remote node acquires addresses from the hub backplane master which tie the particular remote node to the hub backplane. The backplane master manages the initialization process, providing addresses to each of the other remote nodes, as required.

22 Claims, 9 Drawing Sheets

MEDIATOO INITIALIZATION PROCESS

CONTROL MESSAGE TRANSMISSION

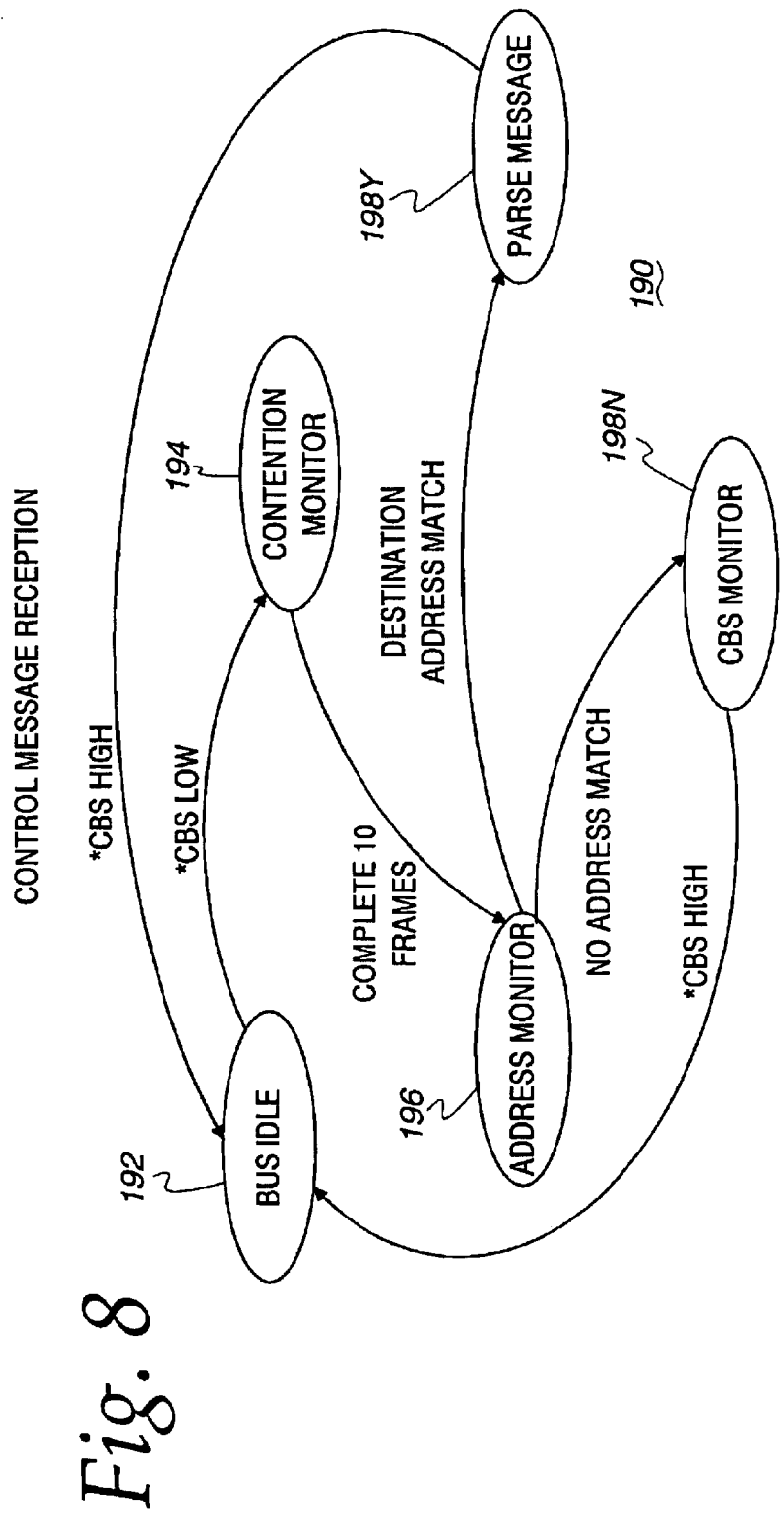

INITIALIZATION METHOD FOR AN ENTERTAINMENT AND COMMUNICATIONS NETWORK

RELATED APPLICATIONS

The present application is related to U.S. patent application Ser. No. 09/849,649, filed May 4, 2001 entitled "DIGITAL MULTI-ROOM, MULTI-SOURCE ENTERTAINMENT AND COMMUNICATIONS NETWORK" to Tomassetti et al.; U.S. patent application Ser. No. 09/849,693, filed May 4, 2001 entitled "CONTROL MESSAGING FOR AN ENTERTAINMENT AND COMMUNICATIONS NETWORK" to Tomassetti et al.; and U.S. patent application Ser. No. 09/849,698, filed May 4, 2001, entitled "A DATA STRUCTURE FOR AN ENTERTAINMENT AND COMMUNICATIONS NETWORK" to Tomassetti et al., all assigned to the assignee of the present invention.

BACKGROUND OF THE INVENTION

1. Field of the Invention

The present intention is related to peer-to-peer local area networks (LANs) and, more particularly to automatically initializing a peer-to-peer network wherein nodes are identified and resources allocated such that control data and information, especially multimedia information, is provided to stations connected to nodes on the network.

2. Background

A typical audio system has a centralized receiver that includes a tuner and program function selector (where a program source is selected) and one or more sets of speakers, e.g., a local speaker set and remote speaker sets. The centralized receiver controls the volume at all speaker sets, i.e., on both the local speaker set and on the remote speakers. The receiver selects a single program source for play at any and all of the speaker sets. Only one source is selected and available at all of the speaker sets at a time, even though the receiver may have inputs from multiple devices. Input devices may include, for example, a turntable, tape player, a compact disc (CD) player, a minidisk (MD) player and other auxiliary devices, such as a digital audio tape (DAT) player, a digital versatile disc (DVD) player, a videocassette recorder (VCR) or television set.

Transferring multimedia information over a network is known, e.g., steering multimedia data over a network such as the internet or a local area network (LAN). The multimedia data may be raw audio or video data such as a wave file, a bitmap or a movie file. However, typically, multimedia files are compressed using, for example, the motion pictures expert group (MPEG) format to reduce the data volume that must be handled. Furthermore, music or songs may be encoded as compressed audio, for example, using the MPEG layer 3 (mp3) standard. This compressed audio may also be made available as an mp3 file for compact storage, transport and handling. Depending upon the complexity of the audio source file that is compressed, these audio compression techniques can reduce file size by 90% or more, without losing playback quality, i.e., with CD quality playback.

Reduced file size and CD quality sound have made compressed audio files very popular. So, mp3 file libraries are available at numerous internet sites, e.g., mp3.com or napster.com. Further, various software interfaces are available for playing mp3 files, either directly, as they are downloaded to a personal computer (PC) from the internet or, from a cache of previously downloaded mp3 files, e.g., Winamp and RealPlayer. Software packages are also available to encode uncompressed audio, e.g., encoding a music cut from, for example, a CD into a mp3 file. After encoding (called "ripping") the condensed file may be stored on a PC either for subsequent playback at the PC or, for transfer to a dedicated mp3 player, such as the Lyra from RCA or the Rio from Diamond Multi-Media.

A typical such mp3 player looks like a small (about the size of a cigarette package) personal radio with mini-earphones for private listening. Usually, the mp3 files are stored in non-volatile memory in the mp3 player, which may hold an hour or more of encoded music. These dedicated mp3 players normally serve as personal music players that provide a single individual with music and songs selected for the listener's taste.

Although the personal mp3 players may be attached to a sound system, e.g., as an auxiliary device, usually they are not. So, for example, a musical piece being played on a turntable attached to a sound system is not heard through speakers attached to a computer: and, a streaming audio or mp3 file being played on a computer is not heard on the speakers of a home theater system.

Consequently, heavy metal music downloaded by a teenager and being played on a PC in the teen's room may be disturbing everyone else in the house, while a sound system that is intentionally located in a remote, isolated family room may lie dormant. Light music that is being piped throughout the house from a sound system located in the family room and, played at a volume that is barely loud enough to be heard in the crowded family room, may be overly loud in another, nearly empty room. By contrast, the same music set at low volume in a nearly empty family room might not be heard in other rooms where people are standing and chatting.

Further, if such disparate devices were connected together, the connected devices would require some type of command and control unit, such as an audio receiver or a dedicated computer, to direct and route audio, as desired. None of the currently available, state of the art entertainment devices are capable of independent operation in a network of such devices, especially where the network may have any number of remote nodes and some of those nodes may have limited functionality. In addition the remote nodes, typically, must be custom programmed by location.

Thus, there is a need for a peer-to-peer multimedia system wherein a program source from one node in one zone or room can stream multimedia data that is passed under cooperative control of all nodes to one or more other zones or rooms, where the data may be independently controlled and played. Further, there is a need to initialize such a system such that all independent nodes on the peer-to-peer multimedia system operate independently, but in synchronous cooperation with each other.

SUMMARY OF THE INVENTION

It is therefore a purpose of the invention to distribute digital audio to different zones within the same structure;

It is another purpose of the invention to independently distribute separate audio data streams to different zones within the same structure;

It is yet another purpose of the invention to synchronously pass digital audio between zones in a structure;

It is yet another purpose of the invention to begin operation of a peer-to-peer multimedia network such that connected nodes operate synchronously:

It is yet another purpose of the invention to distribute control function amongst peer nodes of a peer-to-peer network such that the network begins operation with all connected nodes operating synchronously and in cooperation with each other.

The present invention is a method of initializing a multi-zone peer-to-peer entertainment and communications network. During normal network operation, data is streamed from one or more entertainment media source nodes to multiple independent other nodes and, then, passed to connected receivers and/or transceivers. The receivers and transceivers may be located in different zones from each other. The zones may be different rooms in a building or house. The preferred peer-to-peer network initialization sequence is an autonomous process.

During initialization, at least one backplane address is assigned to each network hub port and to each local node. One hub port is designated as backplane master. Upon power-up or a reset, a remote scan is initiated, automatically, from the hub ports to the remote nodes. Each remote node acquires addresses from the hub backplane master which tie the particular remote node to the hub backplane. So, any remote node requiring an address responds to the remote scan indicating that one or more addresses are needed. Then, nodes requesting addresses enter a contention arbitration phase to select the next requesting node which is assigned addresses next. Addresses are assigned to the remote mode nodes, giving priority according to serial number, lowest to highest. The backplane master manages the initialization process, providing addresses to each of the other remote nodes, as required.

Advantageously, the initialization scheme of the present invention allows the network to be dynamically auto-configurable. By using the auto-initialization sequence, the network dynamically "seeks" and assigns all devices at network nodes connected to it. Each remote node automatically identifies and defines its network connection and broadcasts its presence to all other connected devices at other nodes. After the initialization sequence, the system automatically reconfigures so that the "brains" of the system are distributed amongst the nodes and the peer-to-peer hub acts as passive device. Any number and type of connected remote nodes may be included on the network and are each connected to hub ports. Nodes communicate synchronously with each other through the hub and can both receive and inject audio into the data stream. Further, once initialized, the multi-zone multimedia network of the present invention provides digital audio that is available to be played at each node, i.e., in different zones of a structure, such as in different rooms of a house. Each room station converts from digital to analog audio and back, locally, for clear CD quality local sound.

BRIEF DESCRIPTION OF THE DRAWINGS

The foregoing and other objects, aspects and advantages will be better understood from the following detailed preferred embodiment description with reference to the drawings, in which:

FIGS. 7A–B show a state diagram and control data structure in an example of how a node may gain access to the control bus;

FIG. 8 is an example of a state diagram for message reception control;

DETAILED DESCRIPTION OF PREFERRED EMBODIMENTS OF THE INVENTION

Figures 1, 2:
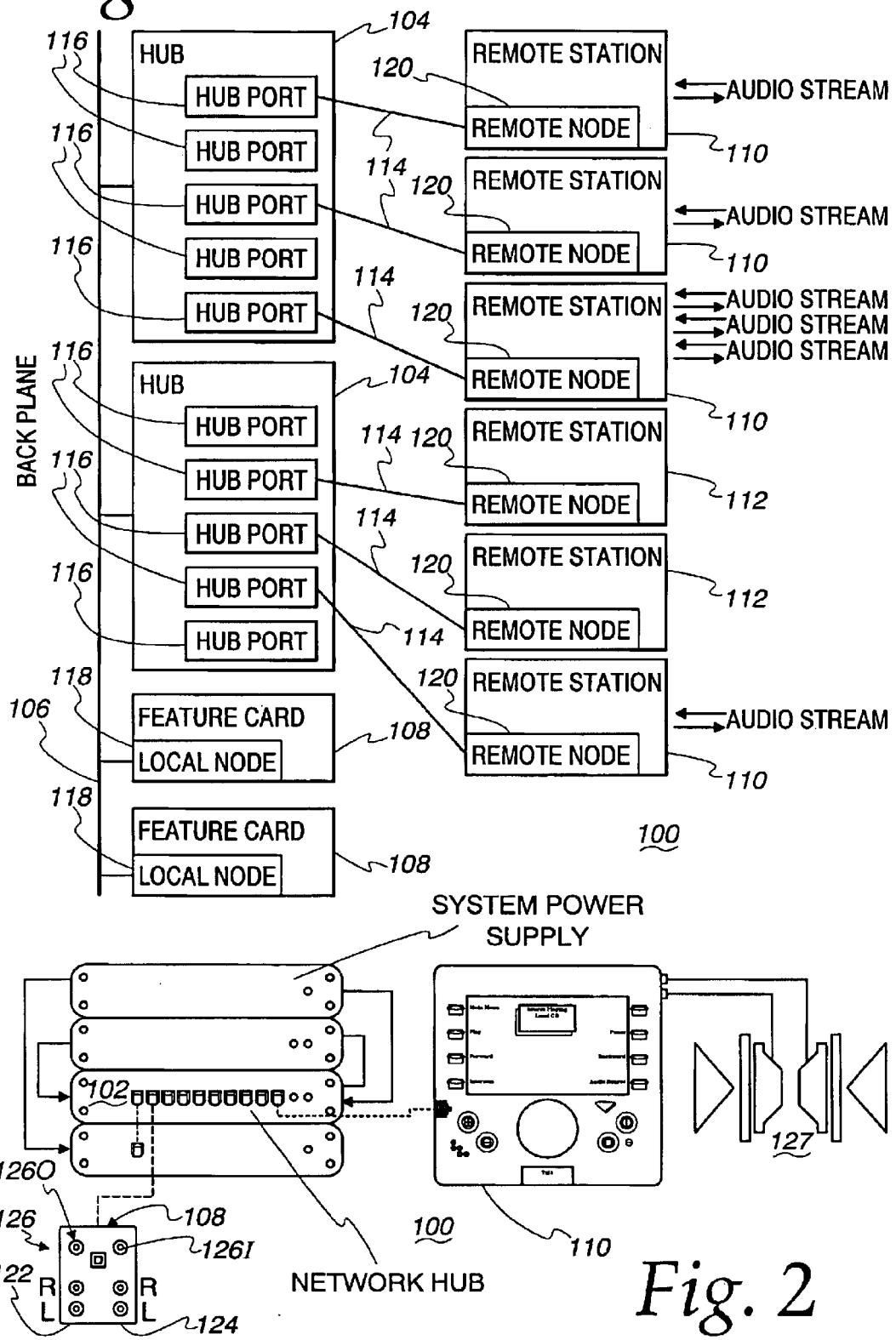
FIG. 1 is schematic representation of a basic example of a local communication network according to the preferred embodiment of the present invention.
FIG. 2 is an of the basic local communication network of FIG. 1.

Referring now to the drawings, and more particularly, FIG. 1 is a block representation of a basic local communication network 100 according to the preferred embodiment of the present invention. In this example, the network 100 includes an expandable hub 102 that may include one or more hub modules 104, (two in this example) which are attached to and in communication with each other over a back plane 106. In addition, one or more local feature cards 108 may be locally attached to the back plane 106 for direct communication to the expandable hub 102. Remote stations 110 and remote feature cards 112 may be located in remote zones (e.g., different rooms) and connected to the hub modules 104 over individual high speed data communications channels 114, e.g., a pair of Ethernet adapters sending/receiving a high speed (10 Mbit/second) serial data stream over a twisted pair. The hub modules 104 and any optional local feature cards 108 may be aesthetically encased in a structured wiring cabinet (not shown) to give the appearance of a typical state of the art home entertainment system. For convenience, an expandable arrangement 102 of hub modules 104 and optional feature cards 106 are referred to hereinbelow, generically, as an entertainment hub 102.

Thus, in this example, each hub module 104 includes hub ports 116; each local feature card 108 includes a local node 118; and, remote nodes 120 are included in each remote station 110 and each remote feature 112. The hub ports 116 are interfaced to the back plane 106, each connecting a remote device, i.e., connecting a remote station 110 or feature card 112, to the network. The local nodes 118 interface the corresponding function of a local feature card 108 to the back plane 106. The remote nodes 120 interface the multimedia function of the remote stations 110 and the remote feature cards 112 to the hub ports 116, providing and receiving data in a format suitable for inter unit serial data communication.

FIG. 2 is an example of the basic local communication network 100 of FIG. 1, which is, essentially, a peer-to-peer network of digital audio devices. Typically, a preferred embodiment system 100 includes a single entertainment hub 102. However, it is understood that multiple entertainment hubs 102 may be included communicating over connected backplanes 106, e.g., with a network bridge. Further, the entertainment hub 102 may be located at a convenient location within a structure, such as a home, with the remote stations 110 and the remote feature cards 112 being located throughout the structure in different zones, i.e., in different rooms. In addition, in the basic example of FIG. 2, a media/communications face plate is shown as an example of a local feature card 108. In this example, the face plate includes a stereo audio input 122 (left and right), a stereo audio output 124 (both left and right) and an optional infrared (IR) port 126 for control. As further depicted, the IR interface 126 may include a separate infrared receiver jack 126I and an infrared emitter jack 126O or a suitable bidirectional IR port may be substituted. Preferable loud speakers 127 are attached to the room stations 110, 120 for playing music, receiving intercom information or, listening to other stations.

Figure 3:
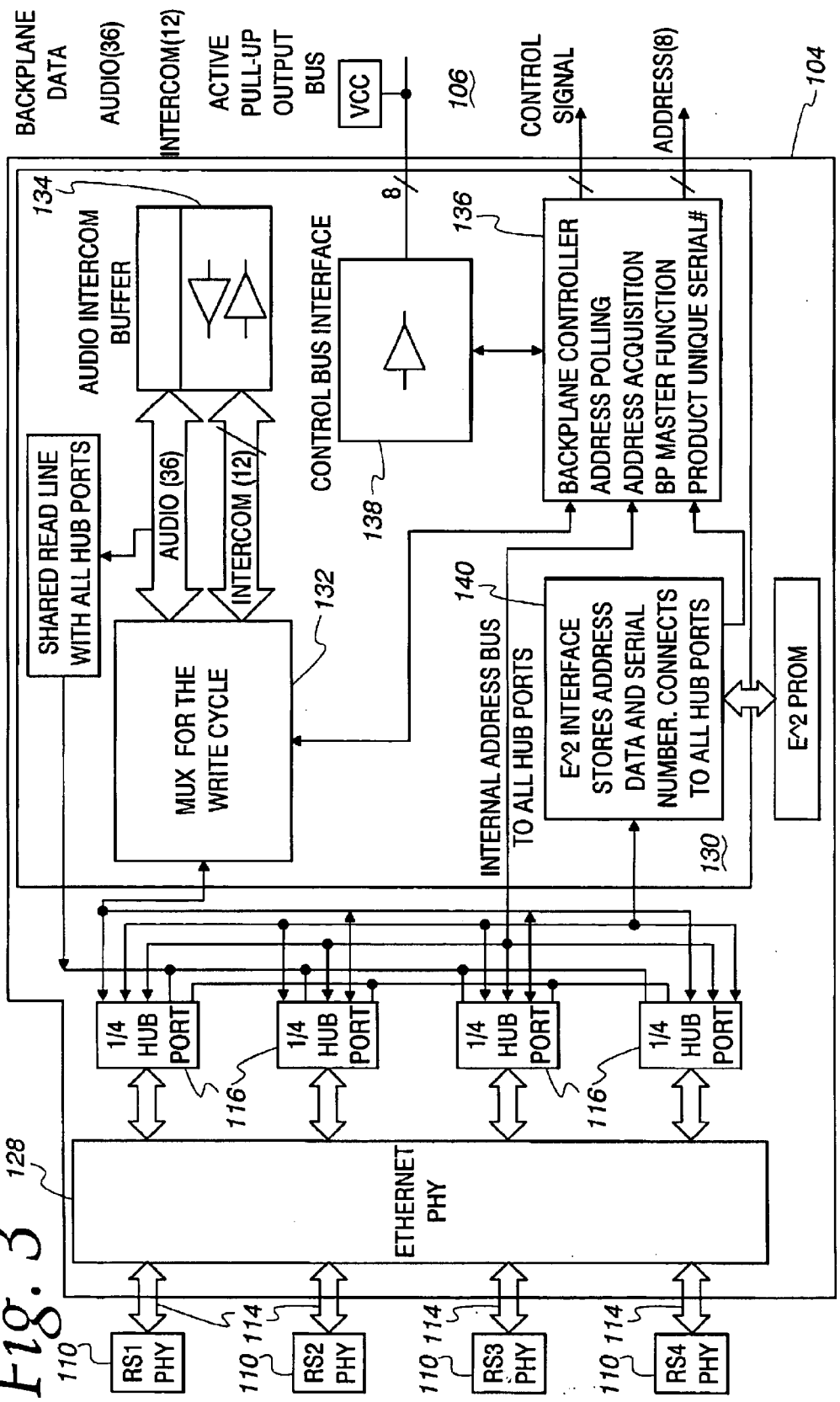
FIG. 3 is a block diagram of the preferred embodiment hub module.

FIG. 3 is a block diagram of the preferred embodiment hub module 104 according to the present invention. As can be seen, the preferred hub module 104 includes preferably four hub ports 116. Each hub port 116 can interface up to four unique audio source address locations and one intercom source which shares a common address with the first audio source address. Each hub module 104 includes a serial interface that may be a local area network (LAN) or serial data interface function, in the example an Ethernet physical layer (Ethernet phy) 128, that connects the serial channel 114 to the hub ports 116. A hub interface 130 interfaces the hub ports 116 to the backplane 106.

The serial data interface 128 mail be readily available Ethernet chip such as, for example, the LU3X31T-64 FASTCAT phy chip interface (phy chip) from Lucent Technologies, the LTX905A Universal 10BASE-T Transceiver from Level One or an equivalent. Preferably, the hub ports 116 and hub interface function 130 are in a single integrated circuit chip such as the Altera 6024, 10K130 or an equivalent. The hub interface function 130 includes a hub port audio channel selector 132 passing digital audio and intercom data between the hub ports 116 and the back plane 106 through an audio/intercom buffer 134. A back plane controller 136 conducts device address polling/acquisition, selectively passing a unique product serial number for each of the attached devices and, when set as master (as described hereinbelow), the master backplane controller controls other attached hub modules 104 during such operations. The backplane controller 136 either actively drives bus signals at the backplane 106 or passively through the dot OR outputs of drivers 138 which are dot connected to other attached devices. A non-volatile storage interface 140 provides an interface to non-volatile storage 142, e.g., EEPROM. The non-volatile storage 142 is included in the hub module 104 for maintaining address assignments, etc., during power off. In the example of FIG. 2, the non-volatile storage 142 is provided for address and configuration data local storage at the hub module.

Thus, each remote node 120 is connected to a hub port 116 over a serial channel 114 using a suitable serial communication medium. The serial channel 114 may be a twisted differential pair connected at each end to an appropriate signaling interface, preferably, conforming with the Institute of Electrical and Electronics Engineers (IEEE) 802.3 specification for Ethernet, such as the above mentioned phy chip. Alternatively, an universal serial bus (USB) interface or an IEEE 1394 fire wire interface may be substituted for the Ethernet interface without departing from the scope of the invention. Further, standard category 5 (CAT 5) wire (4 twisted pairs) is preferred for the high speed data communications media in the channel 114 connecting the entertainment hub 102, i.e., the remote stations 110 and remote feature cards 112 to the hub modules 104. The serial data interface 128 passes locally synchronized serial data from the high speed serial channels 114 to/from the hub ports 116. The hub ports 116 convert the serial data from serial data interface 128 to parallel data which is passed to the backplane 106 and vice versa.

Pulse Transformers (not shown) in each of the remote nodes 120 and hub ports 116 provide signal isolation. The hub modules 102 provide power to connected channels at a level sufficient to power a 10 W Class D amplifier at each station. Channel power is forty eight volts (48V) DC and is distributed through two pair of conductors of the CAT 5 cabling, passed through to the wiring at the hub port 116 pulse transformers center taps. The current is extracted on the receiving end to power the remote nodes 120, drawn from the four current carrying CAT 5 conductors and the center taps of the remote node transformers.

For additional efficiency, the serial data clock for each channel (remote node 120—hub port 116 connection) may be embedded into packet data for that channel using, for example, the well known Manchester encoding technique. Thus embedding the serial data clock also balances the data stream, thereby nearly eliminating the exposure to saturation in the pulse transformer. Once embedded in the data stream, the clock may be extracted from the data stream using a phase locked loop (PLL) with the link pulse function indicating the existence of a connection between each hub port 116 and its corresponding remote node 120.

Data is transferred between the hub modules 102 and the remote nodes 120 using a non-Ethernet serial data frame structure at a preferred transfer rate of 10 Mb/s. Preferably, data is transferred in full duplex, each packet being synchronized with the hub backplane. The packet structure is fixed, preferably at 197 bits, and includes a preamble field, a control bus status field, and specific frames for audio (Laudio 1–4 and Raudio 1–4), intercom (Icom), hub control, and for data control. The preamble is a signature bit stream, preferably 24 bits, for synchronizing the physical layer PLL of each channel. The control bus status (CBS) field may be a single bit field that indicates when the control bus is active. The eight audio frames (Laudio 1–4 and Raudio 1–4), two each per channel, each channel having enough bandwidth to pass compressed or uncompressed audio data to/from the remote nodes, preferably two eighteen bit stereo frames for each channel. Since the intercom channel is intended to carry only voice data, the Icom frame need not be as wide the audio frame and, so, is twelve bit mono. Both the hub control frame and the data control frame are a single byte wide.

Figure 4:
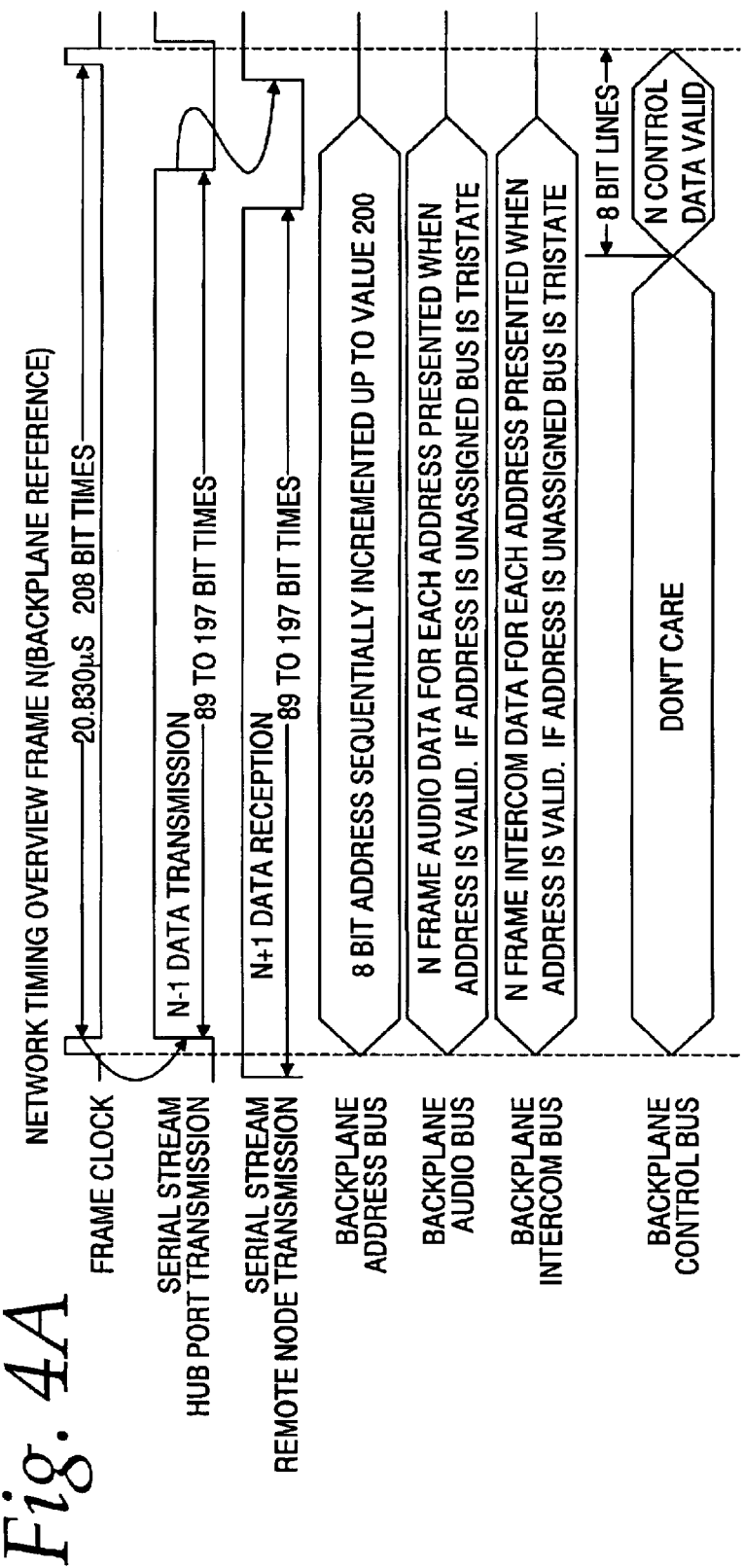
FIGS. 4A–B show a timing diagram and data structure illustrating how messages and data are exchanged between the local nodes and the remote nodes across the backplane.

FIG. 4A is a timing diagram showing how messages and data are exchanged between the local nodes 118 and the remote nodes 120 (through hub ports 116) across the backplane 106 using a data structure, for example, as in FIG. 4B. The backplane 106 includes a data bus for both audio data and intercom data, an address bus, a control bus and several control lines. For the preferred embodiment, the backplane 106 includes an eight bit Address Bus (A7–A0), with addresses being serially cycled, 0–200 in a burst at the 10 MHz backplane clock rate, i.e., one burst in every frame of the 48 KHz clock cycle. Addresses are assigned during initialization as described hereinbelow. Each address corresponds to a possible node in the network 100. The backplane includes stereo audio on two 18 bit channels, Audio Bus (ADL17–ADL0 and ADR17–ADR0), a right and left channel. Intercom data is provided as mono audio on a 12 bit Intercom Bus (I11–I0). Bus data is latched on the positive going edge of a Backplane Clock (BPCLK). An eight bit Control Bus (C7–C0) provides control data information for controlling communication among devices connected to the backplane 106. The Control Bus Status bit (CBS) signals hub ports connected to the backplane 106 when the control bus is active. A Frame Clock (FCLK) line is provided for synchronizing the hub ports 116 to the backplane 106. A Global Reset (Greset) signal initiates a hub wide system reset. A passive pullup Need Initialization (*NEED_INIT) signal is pulled low by any device connected to the backplane that needs initialization.

FCLK synchronizes the entire network at the audio data-sampling rate, preferably 48 Khz, although it may be 44.1 Khz. Generally, the network sampling rate determines the number of possible addresses that can be polled at one time, and a different sampling rate may be selected with a corresponding adjustment in the number of addressable features. Since the entire network is synchronized to FCLK, all data sources and sinks (nodes 116, 120) must operate at the selected sample rate or some sub multiple thereof, i.e., 24 Khz or 12 Khz.

FCLK also synchronizes the hub ports 118 to the backplane and to the address bus. Further, the preamble signature synchronizes hub port 118 to remote node 120. Since the hub ports 118 transmit a packet every FCLK cycle, the preamble provides a precise event which is detectable at the remote nodes 120 for synchronization. Generally, all audio and intercom data conversion processes must be synchronized to the preamble detection to minimize aliasing. Thus, to maintain synchronization, each remote node 120 must initiate a transmission to its corresponding hub port 116 within one frame cycle of receiving a pocket.

Sampled audio data is presented to the backplane 106 on a polled address basis, preferably sampled at forty eight thousand samples per second (48 KSPS). Alternately, any suitable sample rate may be selected such as 44.1 KSPS, for example. Thus, the backplane operating at a 10 Mhz BPCLK clock rate can support up to 200 addresses at this 48 KSPS-frame rate. Accordingly, cycling through addresses 0 through 200 at the backplane clock rate in a burst, one burst of 0–200 every frame clock cycle, each value addressing an audio source/sink (either at a local node 118 or at a remote device connected to a hub port 1116) in the network, each addressed audio source/sink being presented with or providing data in turn. So, when an address is presented on the backplane 106, the appropriate control bus signals, intercom data and audio data for the selected node are also present on the backplane. For example, a person may be using a remote station 110 to transmit an intercom message, while an audio clip may be provided to a local station 108. During each address burst, when the address corresponding to the remote station 110 is on the address bus, the intercom data is placed on the backplane intercom bus and, sampled audio is made available when the address of the local station 108 is on the address bus. Other stations remain passive, monitoring the bus for audio or intercom data that may be directed to that particular station or feature.

Figure 5:
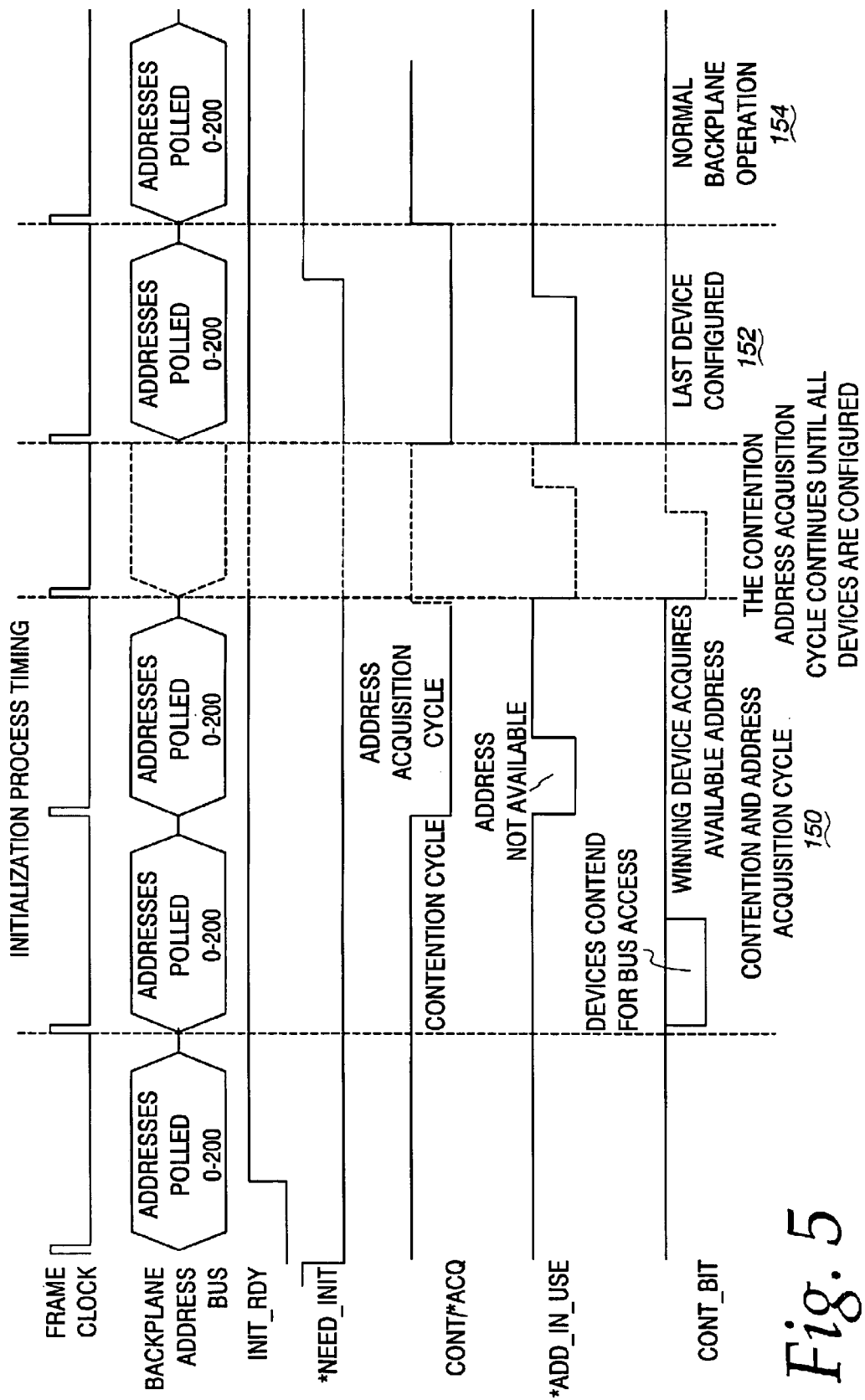
FIG. 5 is an initialization timing diagram.

FIG. 5 is a timing diagram for initialization wherein addresses are assigned to attached devices. In each network 100, a single hub module 104 is assigned as backplane master. Preferably, backplane master hub module assignment is designated for a single unique slot in entertainment hub 102, although any suitable way of assigning a master may be substituted, e.g., jumper pins selecting a backplane master. The single hub module 104 master provides the drive signals for the Frame Clock, Backplane Clock, Address Bus, and Address-in-Use signals. The hub modules are interchangeable and any one may serve as backplane master, provided it is placed in the master slot position in the entertainment hub 102 (or otherwise selected). Thus, the hub interface function 130 includes master control functions that are disabled unless the particular hub module 116 is selected as master. The backplane master hub drives the backplane signals during normal operation and drives initialization signals during the network initialization process. Other devices, i.e., those not the backplane master, accept these signals as inputs.

During initialization the C7, C6, C5 and C0 control bus lines are used by the backplane master to provide individual initialization control. The C7 line is a contention/address acquisition (CONT/*ACQ) signal which is generated by the backplane master to coordinate between a contention cycle and an address acquisition cycle in the period labeled 150. The C6 line is a ready for initialization (INIT-RDY) signal that, when high, indicates that a device attached to the backplane is ready to start the initialization process. The C5 line acts as an address in use (ADD-IN-USE) signal indicating that a device address is already assigned to a node or port. The C0 line is a contention (CONT_BIT) signal both during initialization and during normal operation contention. After the last device has been configured in the period labeled 152, initialization is complete. Normal backplane operation of FIG. 4 begins in the period labeled 154.

Figure 6:
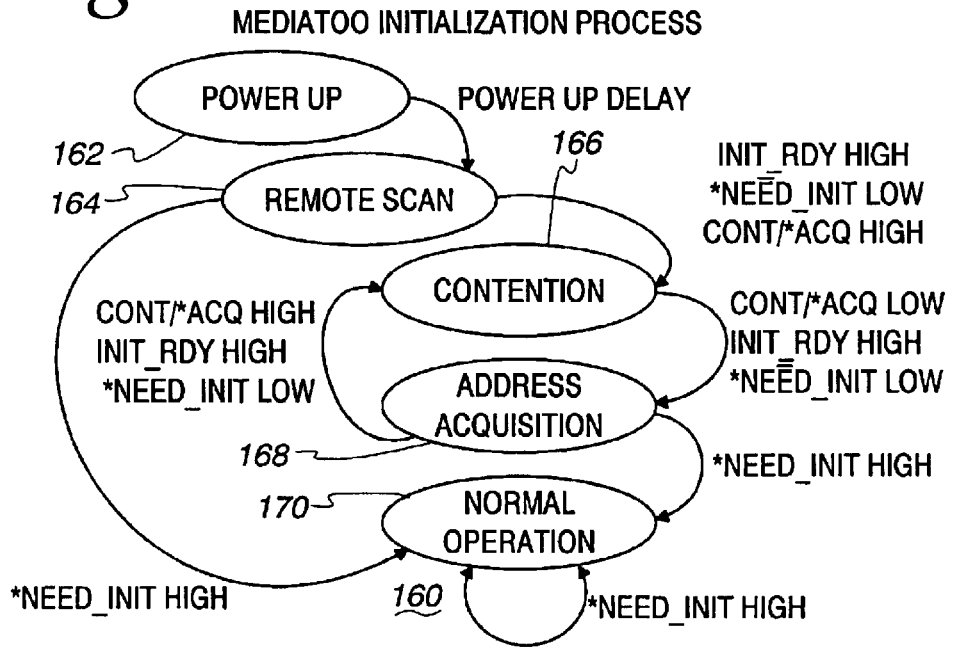
FIG. 6 is a state diagram showing how the preferred local communication network may be initialized.

FIG. 6 is a state diagram showing how the preferred local communication network 100 may be initialized. Network Initialization 160 is an automated process that occurs in the hub modules 104 on first power up 162 or, after a REINIT button (if included) has been pressed to request initialization. The process proceeds through three major phases: remote node scan 164, contention 166 and address acquisition 168. Each feature at a hub port 116 or local node 118 requires at least one backplane address for normal operation, which is assigned during initialization.

First, on first power up 162 every device asserts the *NEED_INIT line, pulling it low to indicate to the backplane master that attached network devices need initialization. At the initial power up 162, the hub ports 116 provide power to corresponding connected remote nodes 120 and after a preset delay send a null packet that the remote node 120 uses for synchronization. Each remote node 120 responds returning a null packet that indicates the number of audio channels needed for that particular station or feature. Coincidentally, each remote node 120 also indicates if it needs additional audio channels by placing a non zero value in the left and right frames of a corresponding returned audio channel. Then, the remote nodes 120 provide the null packet for a selected minimum scan time. If any of a remote node's audio channels are unused, then the unused frames are driven to all zeros (00000h). Each corresponding hub port 140 requests addressing for each filled (non-zero) audio frame, with every requesting hub module 104 or feature card 108 holding the INIT_RDY line low during the remote scan sequence 164.

Following the remote node scan 164, every hub port 116 and each feature card 108 configures its backplane-connected audio bus port as a passive high, active low I/O port. Then, the unassigned hub ports 116 and feature cards 108 begin shifting their respective unique serial number (preferably a factory-set 36-bit number) onto the CONT_BIT line synchronized by the frame clock signal, while simultaneously monitoring the CONT_BIT. If for any monitoring device, the value of the CONT_BIT does not match what it shifted out, then another device is also requesting initialization, i.e., devices are in contention; and, each unmatched device discontinues shifting its serial number out and releases the passive pullup CONT_BIT line for the remainder of the contention cycle. Each matching device continues to write their serial numbers to the CONT_BIT until, eventually, only a single device remains actively requesting addresses. The remaining unmatched devices, i.e., those that have placed their respective CONT_BIT output in a high impedance state, wait until the next contention cycle, when the next unassigned device is selected. The matching device proceeds to the address acquisition cycle 168.

For each address acquisition cycle 168, again synchronized by the FCLK signal, the backplane master sequentially cycles through the all addresses as the matching device monitors the passive pullup *ADD_IN_USE line. Each previously configured device asserts the *ADD_IN_USE line as each of its addresses appears on the address bus. When an available address is identified (i.e., the ADD_IN_USE line is not asserted), the backplane master assigns the identified available address to the requesting internal hub port. Unassigned devices continue monitoring, identifying and requesting addresses until all port address assignment requirements have been fulfilled. As each acquiring device has completed its configuration cycle, it releases the *NEED_INIT line and waits for the initialization process to complete.

The contention cycle 166 and address acquisition cycle 168 are repeated until all attached devices have been configured, as indicated by the *NEED_INIT line being released high and then proceeding to Normal Operation 170. On each subsequent power up 162, unless a new device has been added, *NEED_INIT will not be pulled low and so, will be high (all assignments having been retained in local or non-volatile storage) and the system proceeds directly to the Normal Operation 170 state.

After initialization 160 and upon commencing Normal Operation 170, additional local nodes 118 or hub modules 116 may be added to the network by powering down the network 100, attaching the devices to the entertainment hub 102, another powering up to re-execute the initialization process 160. On power up the newly-attached device asserts the *NEED_INIT line low. In response, the backplane master then enters the Initialization process 160, assigning addresses as required.

Additional remote nodes 120 may be attached to the network ("hot plugged") at a configured hub port 116 and so, do not need to be initialized. Further, if remote audio sources/sinks are attached to an existing remote node and the attachment/replacement reduces or does not change the number of sources/sinks at that node, Normal Operation 170 may continue uninterrupted. However, if the number of audio sources/sinks is increased, e.g., a single audio source/sink at a remote node is replaced with a multiple audio sources/sinks, a power down cycle 162 must be initiated to restart the initialization process 160. Then, when each hub module 104 scans its hub ports 116 through the remote node scan cycle 162, the added sources/sinks are detected and identified by asserting the *NEED_INIT line.

By contrast, removing nodes from the network, typically, does not require reinitialization. Remote nodes may be physically removed from the network 100 for example, by simply disconnecting from the serial stream 114 cable or by turning off the device or remote feature card 112. The removed device's hub port retains its address so that the remote node 120 may be re-attached later and it may seamlessly begin to function provided a network re-initialization 160 or a power cycle 162 does not occur before reattachment. However, if the network is re-initialized or power cycled after removal, reattaching the device requires a re-initialization 160, just as if a new device were being added. Initialized local nodes 118 also can be removed and reattached to the backplane without re-initialization, provided the reattached local node retains its address information. Otherwise, the local device should be reset and, network power cycled to re-initialize the new/replaced local device and node.

On the first initialization of a hub module 104, each hub port 116 acquires a backplane address. The hub port 116 then signals its address to its connected remote node 120, which may or may not use or respond to the address. Hub ports 116 do not require a response (ACK or ERR messaging) to their own initiated messages. However, each remote node 120 must signal its corresponding hub port 116 using a hub message to change the listening settings of the hub port 116. The corresponding hub port 116 responds either with an ACK or an ERR response message within 2 frame clock cycles. The serial data stream may include hub control and data control messaging when initiated by a local node 118 or hub port 116 in addition to audio and intercom data which are transferred continuously. Hub control and data control messages are selectively included in packets and passed in the serial stream, one byte per packet. The hub control message frame designates an audio or intercom channel in remote nodes 120. Each remote node 120 queries its corresponding hub port 116 for its present sourcing node and its listening channel settings, as well as, setting the listening channels. Automatically, on first hub power up or on re-initialization, each hub port 116 selects the sourcing channel. Each frame cycle includes only one byte of hub messaging in the hub control field. As each hub message is passed, byte by byte, the entire message is re-assembled at the receiving node, i.e., either at the hub module 104 at one end or at the remote station/feature card 110, 112 at the other. Preferably, each hub message is four (4) bytes wide and prefaced with an attention byte (e.g., FFh) to notify the intended receiver (either hub module 104 or remote station/feature card 110, 112) that a hub message is to follow.

The attention byte may be followed by a command directing the receiving node regarding how to handle the audio data on the channel. Examples of commands provided in this second, command byte are shown in Table 1 below.

TABLE 1

| NUL | 00h | 'do nothing, idle value |
| SET | 01h | 'set the channel to value |
| GET | 02h | 'get the channel's value |
| ACK | 03h | 'acknowledge message with channel and value returned |
| ERR | 04h | 'error with channel and value returned |

The command byte is followed by a channel byte that, preferably, includes two (2) four (4) bit fields. The first 4-bit field indicates whether the receiving device is receiving or sending audio and, so, is a sink or a source. The second field selects an audio field, i.e., intercom, audio 1, audio 2, audio 3 and audio 4 for the received/sent audio data. The command byte is followed by an eight bit value ranging from 1 to 200 and indicating the channel address.

Local control messaging provides control for peer to peer communication between nodes, primarily for sharing information or controlling either a local feature card 108 or remote feature card 112. The control message structure may be similar to that of hub messaging wherein one byte in the data control field is passed per packet. However, local control messaging within the communication hub 102 may be quite different. Each local control message contains a multibyte preamble, a destination address, a source address, an indication of the message size, the message and a checksum value for verifying the message validity. Within the communication hub 102, control information is sent over the control bus (C7–C0) which also is an 8 bit wide, contention bus. All hub nodes 116 and local nodes 118 have access to this bus and must contend for control. Preferably, the control bus is passive pull up, active pull down. So, when all connected nodes are idle, the bus is all ones (FFh) indicating that a node is not accessing the bus.

Figure 7A:
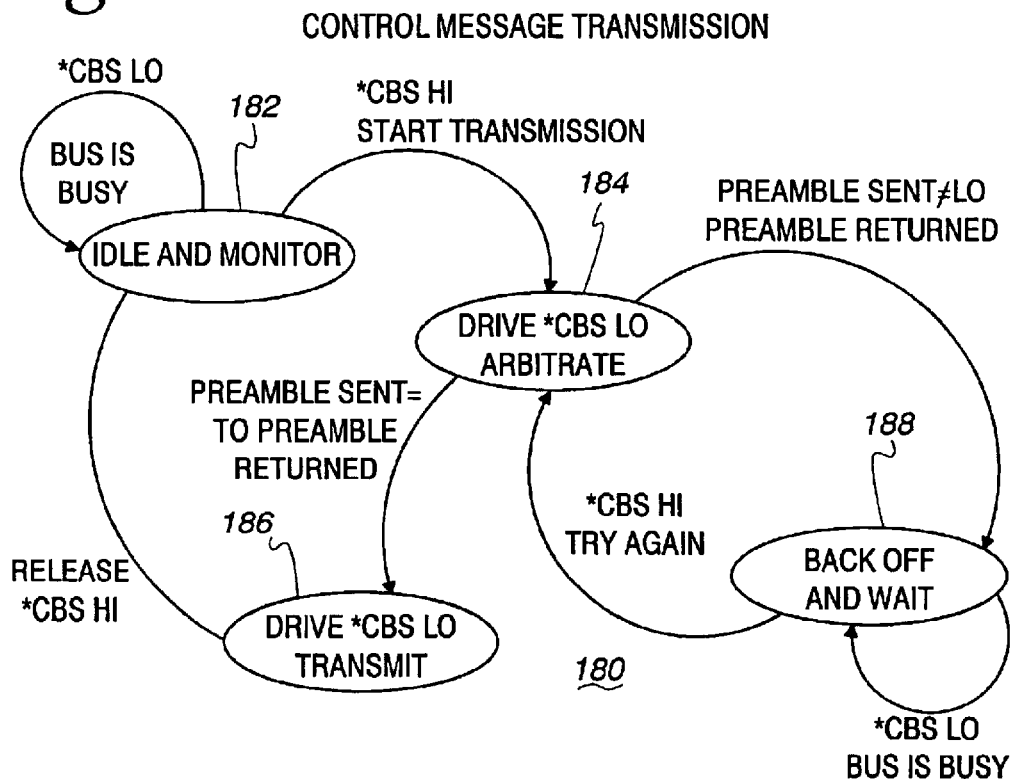

FIG. 7A shows a state diagram 180 of how a node gains access to the control bus. First, before beginning its transmission, in state 182, nodes requiring access monitor the bus until a quiet time is detected. If two or more nodes attempt to communicate simultaneously, an arbitration process 184 assigns priority based on the control message preamble. For confirmation, the values on the control bus are mirrored back to the remote node via the serial stream data frame, delayed by one frame. Local nodes are directly attached to the contention bus and compensate for the delay to remote nodes during the arbitration process.

FIG. 7B shows an example of the preferred control message structure. The control message preamble, which is preferably 8–10 bytes, is utilized for bus access arbitration. Each preamble byte is one of two possible values, either zero (00h) or one (01h) and sets the contention bit CONT_BIT in the control bus. The 10 byte preamble string represents a pseudo-random 10 bit binary number pattern, with the lowest 10 bit value has the highest bus priority. The preamble is followed by a destination address which is a single byte that contains the network address of the destination node. A single byte source address follows the destination address and contains the network address of the message source node. Two bytes are assigned to designate the Number Of Bytes (NOB) in the control message payload. The payload may be as large as 64K Bytes and is the substance of the control message or data. Finally, the payload is followed by a two byte checksum that is the twos complement of the sum of the entire message less the preamble and the checksum itself.

As noted hereinabove, idle nodes monitor the control bus for activity in 182. When the control bus is quiet and the *CBS bit is one, a node may attempt to begin a transmission by asserting *CBS (pulling it low) in 184 and, begin bus arbitration by sending the preamble. The transmitting node must monitor its message transmission (via the return packet or directly at the control bus) to negotiate for control of the bus, detect a collision with another message, or to detect a serial stream data error. The node attempting to initiate transmission monitors the value of the preamble returned from the bus to confirm whether that node has access to the bus. If the preamble value is returned without error, the node has access to the control bus and continues to transmit in 186. However, if the node does not have access it releases the *CBS bit, in 188, ceases transmission and waits until the control bus is idle before attempting to transmit again in 184.

FIG. 8 is an example of a control message reception state diagram 190. Nodes that are directly connected to the control bus (i.e., hub ports 116 and local nodes 118) through the backplane continually monitor the bus and the *CBS bit in 192. Message transmission begins with the assertion of the *CBS bit in 194 by the transmitting node. Each monitoring node parses the message header, which includes the preamble, destination address, source address and NOB fields in 196 to determine if the node is the message destination. Either the message may be directed to a specific address or it may be broadcast, for example as an intercom message. If the message is addressed to a node in 198Y, that node continues processing the message. Otherwise, in 198N, the nodes discard the message and continue to monitor the *CBS bit until it returns to idle in 192, to receive the next new message.

As described above, addresses between 1 and 200 are assigned to each connected node in the initialization process 160. A remote node 120 sets its address by querying its corresponding hub port for its remote node address(es). Address 00h is reserved for broadcast messages and so, no node is assigned this address. All nodes process broadcast messages. Further, one or more addresses may be reserved for the conference intercom function and only the conference feature node may acquire this reserved address.

For synchronization, all backplane address locations must be polled within a FCLK cycle. Further, each serial stream transmission cycle (one upstream and one downstream) cycle completes, preferably, in less than a single frame clock cycle.

Figure 9:
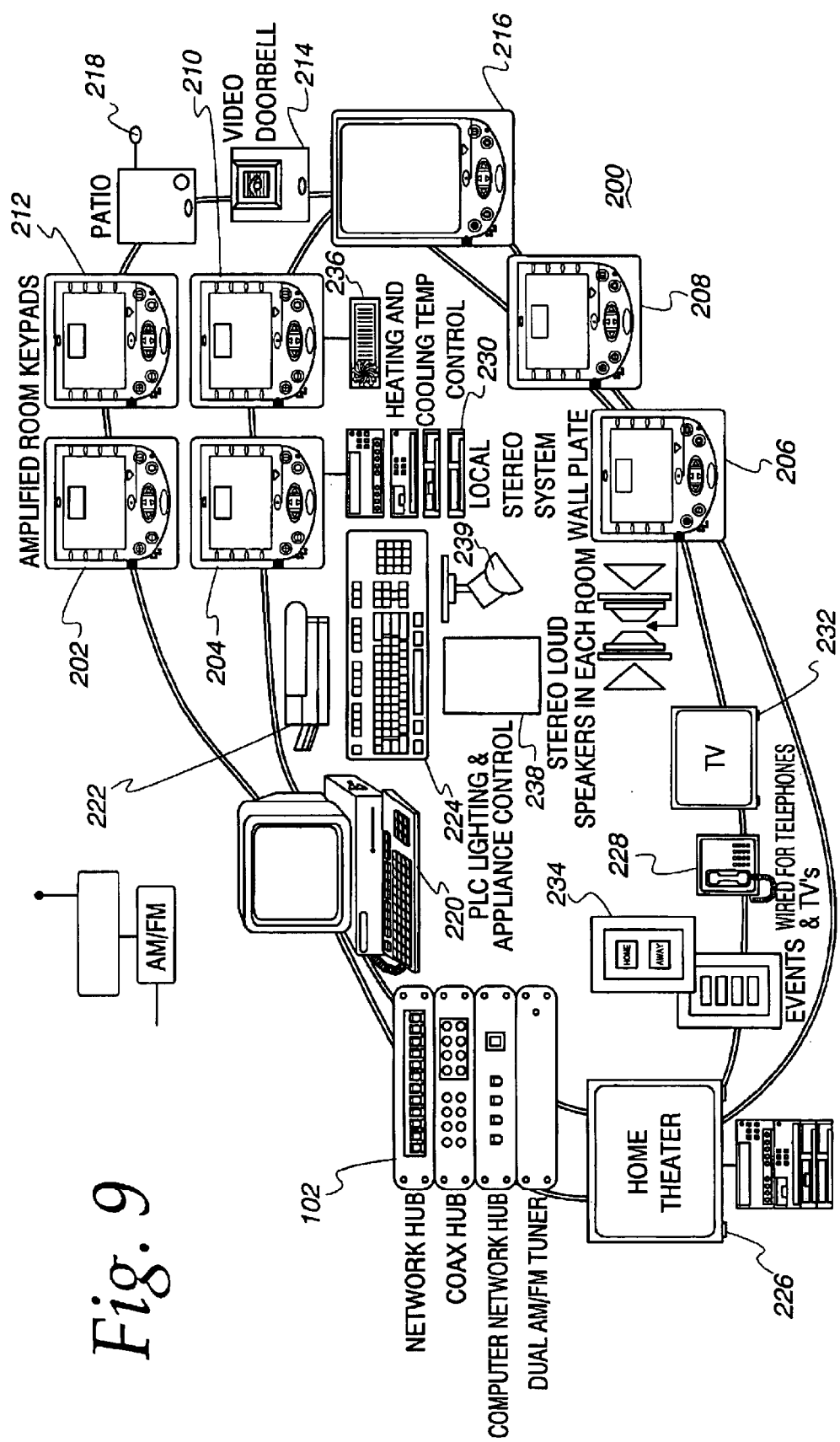
FIG. 9 is an example of a typical preferred embodiment home communication system.

FIG. 9 is an example of a typical preferred embodiment home communication system 200 with elements identical to the basic system 100 of FIG. 2 labeled identically. In addition to the entertainment hub 102, several room stations. 202, 204, 206, 208, 210 and 212 are shown that are physically located at different zones or rooms. A video doorbell 214 is locatable at an exterior door. A main communications panel 216 is provided for control from a conveniently selected location. Outside temperature sensors 218 are locatable to provide external temperature information to the system that may be retrieved at any room station 202–212 or other connected peripheral. In addition, since the network 200 is a digital, one or more computers 220, printers 222 may be attached, directly, to send or receive communications or entertainment data, the remote node/remote station feature being provided as a hardware feature of the computers 220 or in software executed by the computer 220. A wireless keyboard 224 may communicate with the system 200 over the computer 220 or directly, e.g., through an IR port 126. Further access to the Internet may be provided, either through the computer 220 or through a direct connection at the hub port, e.g., through a cable modem or digital subscriber line (DSL) modem.

A home theater system 226 may be connected to the network. The home theater system 226 may be capable of playing or displaying multimedia data received from the network or, of sending multimedia data, such as audio files over the home communications system 200 to individual room stations 202–212, for example. A telephone 228 may be included, such that music from the network is played as background music when the telephone 228 is placed on hold and, to provide voice mail that is stored on the system 200. An entertainment/sound system 230 may be connected to the network and located in a media room. Like the home theater system 226 the sound system 230 can play audio data directly received from the network and may be capable, for example, of placing audio data extracted from an audio cassette onto the network. A television 232, e.g., digital audio TV or high definition TV (HDTV), can be connected to the network 200. The television 232, like the home theater system 226, and the sound system 230, can play audio or multimedia data directly from the network and is capable of placing multimedia data or audio data on the network 200. Also, local, specialized controls may be made available at different zones throughout the network. These local controls 234 can provide, for example, home or away settings to vary the capability of the system. Temperature control 236 for heating and cooling may be connected for independent control at any station 202–212. Also, a programmable logic controller (PLC) 238 may be adapted, if available, allowing independent remote control of lights 239 and other such controlled appliance from enabled stations 202–212.

Figure 10:
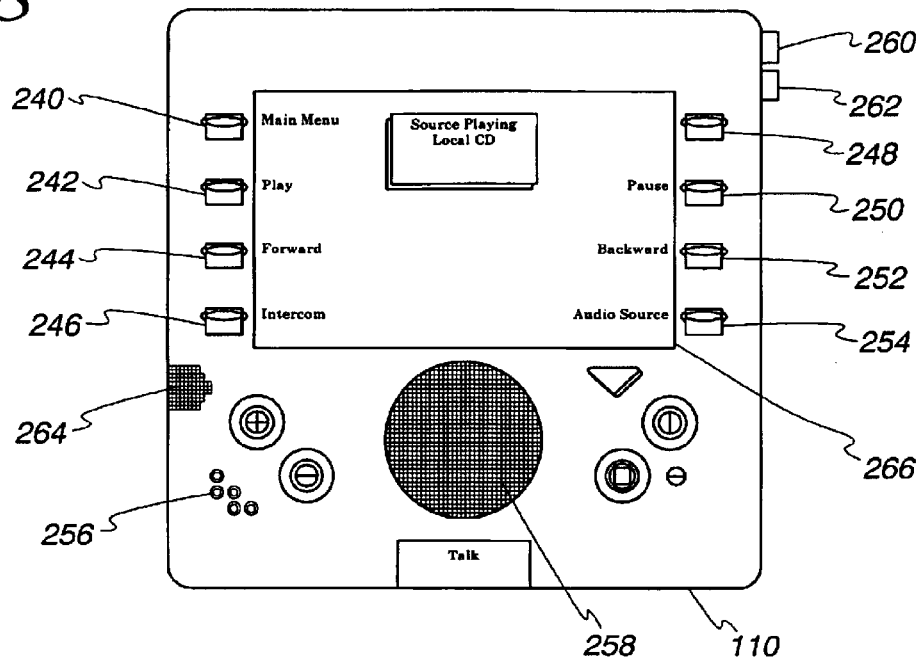
FIG. 10 is an example of the room station.

FIG. 10 is an example of the room station, 110. In this example, the room station includes multiple buttons, 240, 242, 244, 246, 248, 250, 252, 254, for selecting various functions from the room stations. A microphone input 256 is provided for receiving vocal input and a small speaker 258 is included, if loudspeakers are not provided, for intercom function. Jacks, 260, 262, are also included for audio input. A digital communication jack 264 in this example, an ethernet connection or category 5 wiring, is also included for connecting the local station 110 to the network. Also, a display 266, such as a liquid crystal diode (LCD) display, is included, providing a simple local graphical interface. Thus, preferred room stations include the capability to act as an audio source unit, an audio receiver unit and an intercom unit. Sound tone and volume may be set at each individual room station 110 independently of settings at other room stations 110. Further, a door station does not require the audio source function and, so, a suitable door station results by omitting the audio function from a room station 110.

Figure 11:
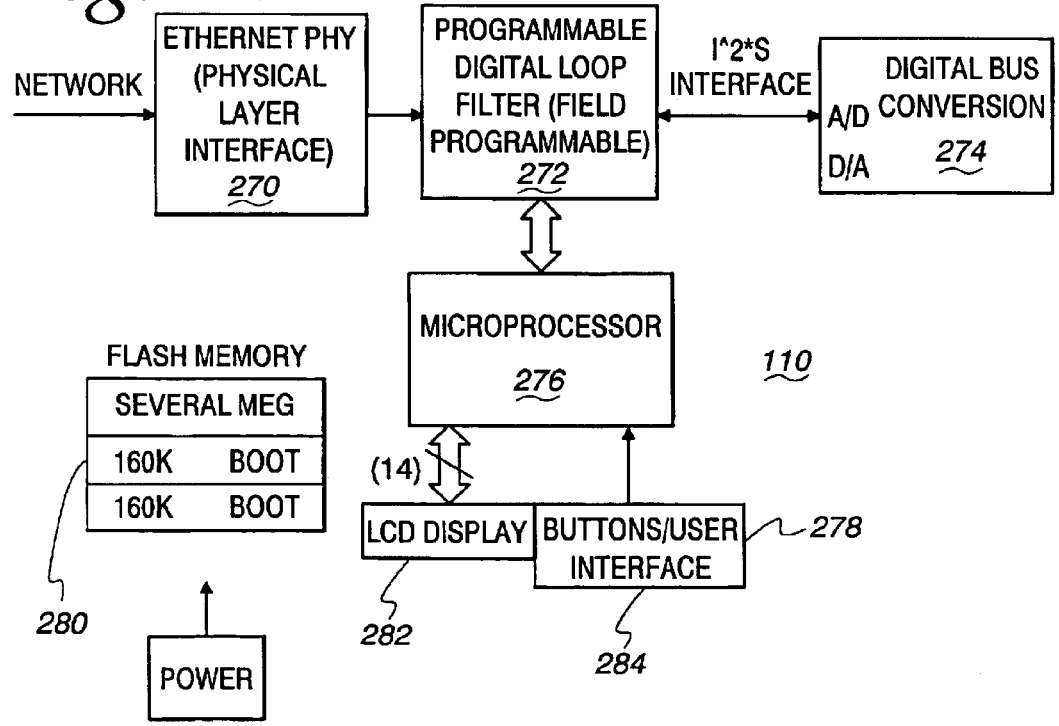
FIG. 11 is a block diagram of a remote station.

FIG. 11 is a block diagram of a remote station 110. Remote station 110, typically, includes a serial data exchange 270, a programmable digital loop filter 272, an audio compression/decompression (CODEC) 274, a microcontroller or microprocessor 276, a local interface 278 and local storage 280. The local interface 278 may include a display 282, such as a LCD display 266, for displaying status information and time, for example, and individual buttons 284 for manual input, such as providing commands to connected room stations, remotely disabling command input from other stations. Commonly used commands may be maintained in a command menu provided at the display 282. The local storage 280 may be any suitable storage, in particular random access memory (RAM). Further, the RAM may be static RAM (SRAM), dynamic RAM (DRAM) or non-volatile RAM such as what is typically referred to as Flash memory. As described hereinabove, power 286 is supplied over the high speed serial data channel 114.

The serial data exchange 270 may be a transceiver or, a phy chip as described hereinabove with reference to the hub module 104. The audio CODEC 274 provides an analog/digital interface between analog audio (provided to the local station 110 from the network or provided by the local station 110, e.g., from a radio tuner) and digital audio to/from the programmable digital loop filter 272. The CODEC 274 converts digital audio data from the programmable digital loop filter 272 into analog audio for a local audio performance and converts analog audio received at the local station into digital audio data which is provided to the programmable digital loop filter 272. Preferably, the audio CODEC 274 is a Crystal CS4227 6-channel 20-bit CODEC chip from Cirrus Logic. The preferred CODEC 274 can support at least one 18-bit stereo/audio channel and one intercom channel. Additional, optional channels may be included. The non-volatile storage 280 locally maintains stored information and program control including a bootstrap program for bootstrap start up of the microcontroller 276. Preferably, the non-volatile storage is flash memory or EEPROM and may include up to several megabytes of storage. The serial data exchange 270 extracts received serial data from the high-speed serial data channel 114 and, embeds the serial data clock into serial data for transmission across a high-speed serial data channel 114.

Figure 12:
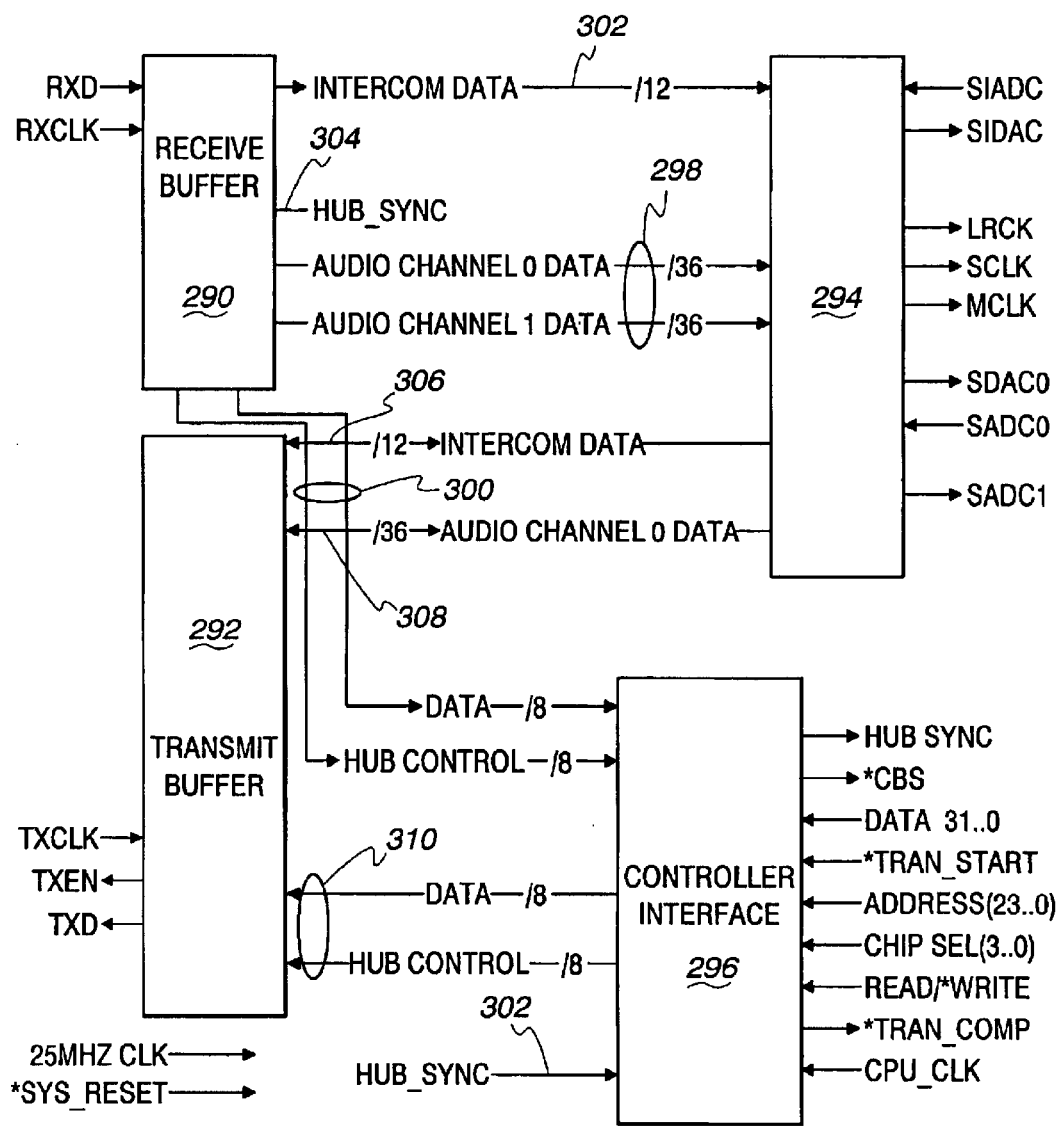
FIG. 12 is a block diagram of the digital loop filter.

FIG. 12 is a block diagram of the programmable digital loop filter 272. The programmable digital loop filter 272 includes a receive buffer 290, a transmit buffer 292, a CODEC interface 292 and a microcontroller interface 296. The receive buffer 290 is essentially a serial-to-parallel shift register receiving data (RXD) clocked by receiver clock (RXCLK) from the serial data exchange 270 and converts that serial data to parallel data which is provided as audio channel data on lines 298 to CODEC interface 294 and hub control and data on lines 300 to microcontroller control interface 296. The receive buffer 290 also provides intercom data 302 to the CODEC interface 294 and extracts a hub sync signal 304 from the received data. The transmit buffer 292 receives parallel data from the CODEC interface 294 and microcontroller interface 296 which it converts to serial data (TXD) that is provided to the serial data exchange 270, clocked by transmission clock (TXCLK). The transmit buffer also provides a transmit enable signal (TXEN) that indicates when the serial data from the station should be transferred through the serial data exchange 270 across the high-speed serial data channel 114.

Parallel data from the CODEC interface 294 includes intercom data on lines 306 and audio channel data on lines 308 as well as hub control and data from the microcontroller interface on lines 310. The CODEC interface 294 passes received data from the receive buffer to the CODEC 274 and passes data from the CODEC 274 to the transmit buffer 292 for transmission across the high-speed data channel 114. The microcontroller 296 presents data from the receive buffer 290 to the microcontroller 276 and passes data from the microcontroller 276 back to the transmit buffer 292. The hub sync signal 304 is generated when the receive buffer 290 senses a preamble in the receive data stream, which initiates a pulse that is the hub sync signal 304. Additionally, the receive buffer 290 parses serial data from the serial data exchange 270 and identifies audio data for the audio channels 298 and control data and control signals 300 for the microcontroller interface 296. The hub sync signal 304 synchronizes the remote station to the hub. Although the data may be received at the remote station somewhat delayed from the original transmission, due to transmission channel delays, for example, the extracted signal is a true replica of what the hub transmits. Likewise the hub receives an exact replica of what the remote station transmits.

Local feature cards 108 may be formed by directly interfacing the hub function control 130 of the hub module with the CODEC 274, thereby providing the audio function directly to the hub control function which interfaces the audio digital data to the backplane instead of to hub ports. Local feature cards 108, may include, for example, a radio tuners providing broadcast radio, e.g., AM, FM and wideband radio such as weather band radio or television broadcast bands.

Thus, the multi-zone media network of the present invention provides digital audio available for use at each zone of a structure or different rooms of a house. Further, multi-zone media network includes room stations that can inject audio into the data stream and onto the network. So, at each room station is converted from digital data to analog audio and locally amplified for clear CD quality sound. Since the audio is transferred over the preferred multi-zone media network as digital data, high-cost, low-loss wiring that is required to route high quality audio is unnecessary. Instead, relatively inexpensive CAT 5 wiring may be used to pass data from the hub to the room stations. Further, the room stations independently control and select what is played in the room from one of several audio data channels being streamed, rather than merely play what is being broadcast. In addition, each remote station itself can broadcast or receive independent of and simultaneously with other remote stations. Also, each remote station can be programmed for individual specific needs such as including radio station presets on remote stations equipped with a radio tuner. Alarms or limited functionality may be included, such as to the ability to monitor another remote using the multi-zone media network's intercom function.

While the invention has been described in terms of preferred embodiments, those skilled in the art will recognize that the invention can be practiced with modification within the spirit and scope of the appended claims.

We claim:

1. A method of initializing a peer-to-peer network of devices, at least one of said devices remotely located at a remote node, said remote node being connected to a hub port on said network, said method comprising the steps of:
   a) scanning remote nodes for nodes requesting communications channel addresses for unassigned active communications channels, comprising:
      i) providing a null packet to each remote node for synchronization; and
      ii) receiving a return null racket from said each remote node, said return null packet indicating a number of unassigned active communications channels at said remote node;
   b) identifying a requesting node for channel address assignment;
   c) assigning an unassigned channel address to said identified node; and
   d) repeating steps (b) and (c) until all requesting nodes have received channel addresses for all corresponding active communications channels.

2. The method as in claim 1, wherein the step (i) of scanning remote nodes further comprises providing power to said remote nodes.

3. The method as in claim 1, wherein the step (b) of identifying a requesting node comprises the steps of:
   i) shifting a first bit of an identification number onto a signal line, said identification number being unique to the hub port connected to said requesting node;
   ii) monitoring said signal line to determine whether said signal line matches such shifted bit;
   iii) shifting a next bit onto said signal line; and
   iv) repeating steps (ii) and (iii) until all bits have been shifted onto such signal line.

4. A method as in claim 3, wherein in the identification step (b)(ii), when the signal line does not match the bit shifted onto the signal line, then at least one other node is requesting an address, said identification step (b) further comprising the steps of:
   ii1) discontinuing identification;
   ii2) waiting until address assignment is complete for paid other requesting node; and
   ii3) returning to step (c)(i).

5. A method as in claim 4, wherein when the first bit is shifted onto the signal line, step (b)(i) further includes asserting an initialization ready line; and, step (b)(ii1) further includes releasing said initialization ready line.

6. A method as in claim 5, wherein the step (b)(ii2) of waiting until address assignment is complete comprises the steps of:
   A) monitoring said initialization ready line for an indication that said other node is being initialized; and
   B) waiting until said initialization ready line indicates said node has been initialized.

7. A method as in claim 6, wherein the step (c) of assigning addresses comprises the steps of:
   i) monitoring an address-in-use line;
   ii) sequentially placing addresses on an address bus; and
   iii) assigning addresses not indicated as being in use by said address-in-use line.

8. A method as in claim 7, wherein one node is identified as a master node, the master node sequentially placing the addresses on the address bus and assigning addresses and, wherein as each address is presented on said address bus in step (ii), corresponding nodes, having been assigned said addresses, assert said address-in-use line to indicate that said presented address is assigned.

9. A method as in claim 8, wherein in the step (b) of identifying a requesting node a plurality of nodes assert a need-initialization signal and, wherein when an address has been assigned to each node, said requesting node releases said need-initialization signal indicating the initialization process has been completed, said need-initialization signal remaining asserted until addresses have been assigned to all active communications channels.

10. A method as in claim 9, wherein said initialization process is started responsive to a power on condition.

11. A method as in claim 9, wherein said initialization process is started responsive to a manual initialization request.

12. A method of adding new remote nodes to a media network, said method comprising connecting said requesting node and an associated device to a hub port and initializing as in claim 9.

13. A method of initializing a peer-to-peer network of devices, at least one of said devices remotely located at a remote node, said remote node being connected to a hub port on said network, said method comprising the steps of:
   a) identifying one hub port as a bus master, said bus master asserting an initialization signal to begin network initialization;
   b) scanning remote nodes to identify if any nodes are requesting address assignment for unassigned active communications channels responsive to said initialization signal;
   c) identifying a requesting node for channel address assignment;
   d) assigning an unassigned channel address to said identified node; and
   e) repeating steps (c) and (d) until all requesting nodes have received channel addresses for all corresponding active communications channels, and
   f) placing said identified bus master port in a normal operating state, said bus master operating identically to other hub ports.

14. A The method as in claim 13, wherein in the step (b) of scanning remote nodes comprises the substeps of:
   i) providing a null packet to each remote node for synchronization; and
   ii) receiving a return null packet from said each remote node, each said return null packet indicating a number of unassigned active communications channels at a corresponding said remote node.

15. A method as in claim 14, wherein unassigned active communications channels are indicated by a non-zero value in a left frame and a right frame of each unassigned active communications channel.

16. A method as in claim 14, wherein each hub port connected to a remote node participates in said identification step (c), said identification step (c) comprising the steps of:
   i) shifting a first bit of an identification number onto a signal line, said identification number being unique to the hub port connected to said requesting node;
   ii) monitoring said signal line to determine whether said signal line matches each shifted bit;
   iii) shifting a next bit onto said signal line; and
   iv) repeating steps (ii) and (iii) until all bits have been shifted onto such signal line.

17. A method as in claim 16, wherein in the identification step (c)(ii), when said hub port determines that the signal line does not match the bit shifted onto the signal line, then at least one other node is requesting an address, said identification step (c) further comprising the steps of:

ii1) discontinuing identification for said connected requesting node;

ii2) waiting until address assignment is complete for another requesting node connected to another hub port; and ii3) returning to step (c)(i).

18. A method as in claim 17, wherein when the first bit is shifted onto the signal line, step (c)(i) further includes asserting an initialization ready line; and, step (d)(ii1) further includes releasing said initialization ready line.

19. A method as in claim 18, wherein the step (c)(ii2) of waiting until address assignment is complete comprises the steps of:

A) monitoring said initialization ready line for an indication that said other node is being initialized; and B) waiting until said initialization ready line indicates said other node has been initialized.

20. A method as in claim 17, wherein if in the identification step (c)(ii) the signal line matches every shifted bit, the matching hub port is assigned addresses in step (d), the step (d) of assigning addresses comprising the steps of:

i) monitoring an address-in-use signal line;

ii) sequentially placing addresses on an address bus, each respective other hub port asserting said address-in-use signal responsive to an address on said address bus previously assigned to said other hub port, said bus master placing addresses on said address bus; and iii) automatically assigning addresses not indicated by said address-in-use line as being in use by other said hub ports.

21. A method as in claim 20, wherein said initialization process is started responsive to a power on condition.

22. A method as in claim 21, wherein said initialization process is started responsive to a manual initialization request.

* * * * *